United States Patent [19]

Bosse et al.

[11] Patent Number: 5,512,229
[45] Date of Patent: Apr. 30, 1996

[54] PROCESS OF UNIFORMLY EXPANDING POLYMER FILM

[75] Inventors: Charles F. Bosse; Rajagopal R. Kowligi, both of Tempe, Ariz.

[73] Assignee: Impra, Inc., Tempe, Ariz.

[21] Appl. No.: 248,606

[22] Filed: May 25, 1994

Related U.S. Application Data

[63] Continuation of Ser. No. 977,562, Nov. 17, 1992, Pat. No. 5,321,109.

[51] Int. Cl.$^6$ .......................... B29C 55/00; B29C 55/20
[52] U.S. Cl. ............................ 264/161; 264/291
[58] Field of Search ................... 264/127, 161, 264/291, 176.1, 211

[56] References Cited

U.S. PATENT DOCUMENTS

| | | |
|---|---|---|
| 2,759,217 | 8/1956 | Peterson . |
| 2,873,474 | 2/1959 | Shields et al. . |
| 2,912,716 | 11/1959 | Frownfelter . |
| 2,933,759 | 4/1960 | Startzell . |
| 3,426,118 | 2/1969 | Chapman et al. ............. 264/230 |
| 4,085,175 | 4/1978 | Kenchel ........................ 264/51 |
| 4,187,390 | 2/1980 | Gore ............................ 174/102 R |
| 4,201,351 | 5/1980 | Tolliver ....................... 242/56 B |
| 4,304,010 | 12/1981 | Mano . |
| 4,331,624 | 5/1982 | Yazawa et al. ............... 264/160 |
| 4,374,690 | 2/1983 | Canterino et al. ............. 156/229 |
| 4,614,011 | 9/1986 | Nicholas et al. ............... 26/73 |
| 4,625,372 | 12/1986 | Hufnagel et al. .............. 26/73 |
| 4,647,416 | 3/1987 | Seiler, Jr. et al. ............. 264/118 |
| 4,684,424 | 8/1987 | Augason ....................... 156/163 |
| 4,685,230 | 8/1987 | Mason, III .................... 38/102.5 |
| 4,830,061 | 5/1989 | Yamamoto et al. ............ 138/177 |
| 4,877,661 | 10/1989 | House et al. .................. 428/34.9 |
| 4,944,668 | 7/1990 | Asano et al. .................. 425/397 |
| 4,963,209 | 10/1990 | Chernega et al. .............. 156/160 |
| 4,966,807 | 10/1990 | Harvey et al. ................. 428/220 |
| 5,036,417 | 7/1991 | Aruga et al. .................. 360/106 |
| 5,084,949 | 2/1992 | Rutz et al. .................... 26/72 |

FOREIGN PATENT DOCUMENTS

| | | |
|---|---|---|
| 2825210 | 6/1978 | Germany . |
| 1329991 | 3/1985 | U.S.S.R. . |
| 63-247021 | 4/1987 | U.S.S.R. . |

OTHER PUBLICATIONS

"Film Stretcher" *T.M. Long Co., Inc.*, undated product catalog of Laboratory Instruments, pp. 1–36.

*Primary Examiner*—Leo B. Tentoni
*Attorney, Agent, or Firm*—David G. Rosenbaum

[57] ABSTRACT

An apparatus and process for expanding polymer films such as PTFE films includes gripping the unexpanded film about its periphery with a number of symmetrically disposed gripping members each equidistant from the center of the film. The gripping members are simultaneously rotated through an arc away from the center of the film, as by pivotally securing each gripping member to the end of an associated expansion arm and rotating the end of each expansion arm away from the center of the film while maintaining the gripping members equidistant from the center of the film. The expansion arms are uniformly rotated by a geared shaft powered by a drive mechanism that extends through the wall of an oven for coupling to an external motor. Also disclosed is an expanded PTFE film made in accordance with such process.

11 Claims, 6 Drawing Sheets

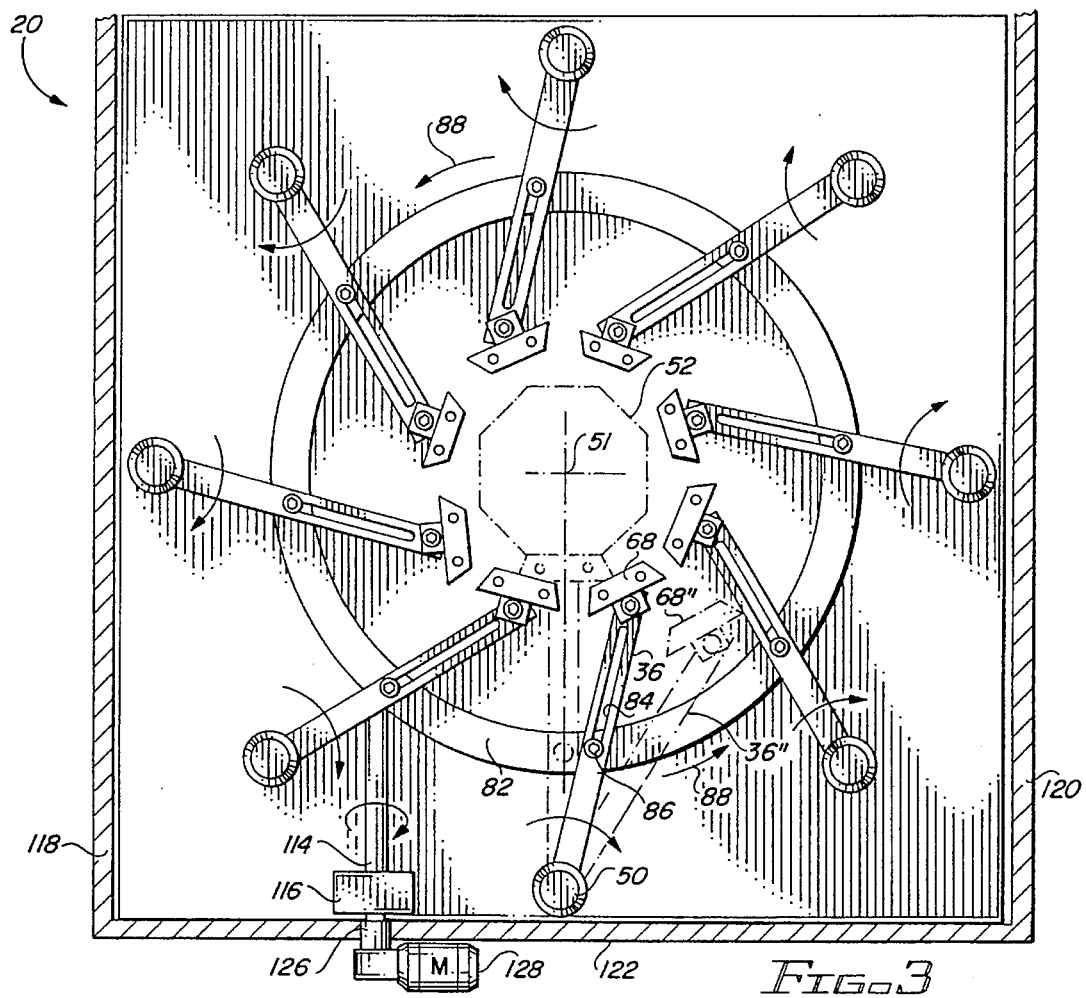
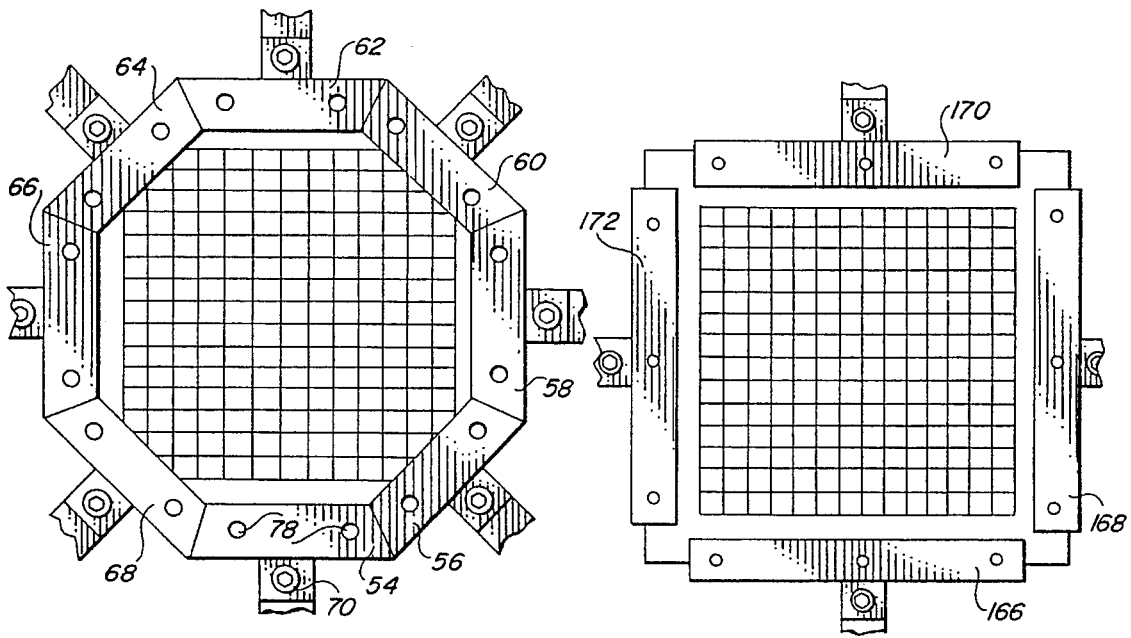

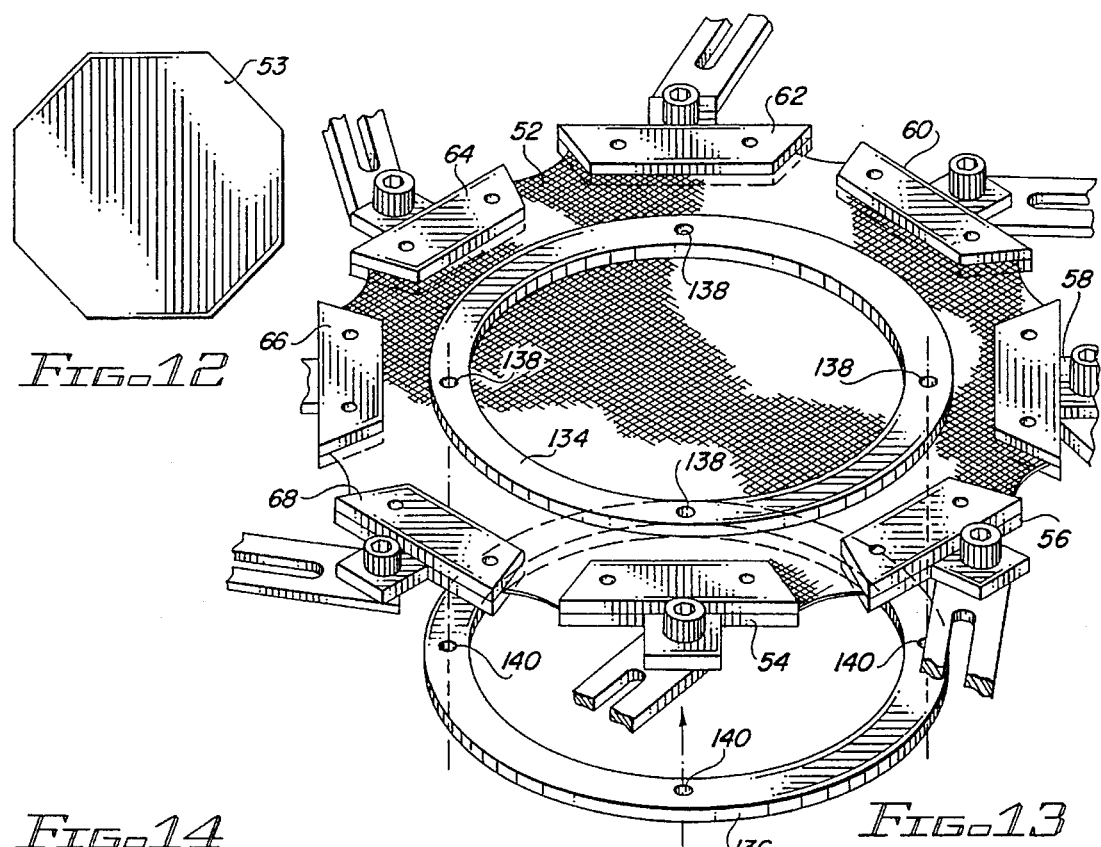
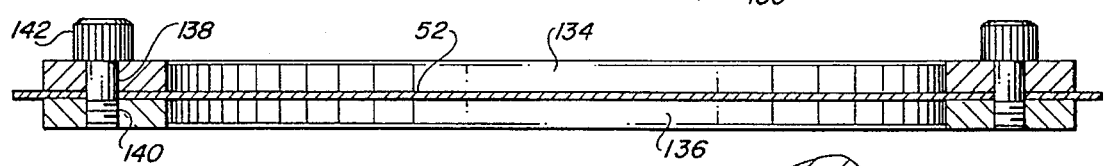
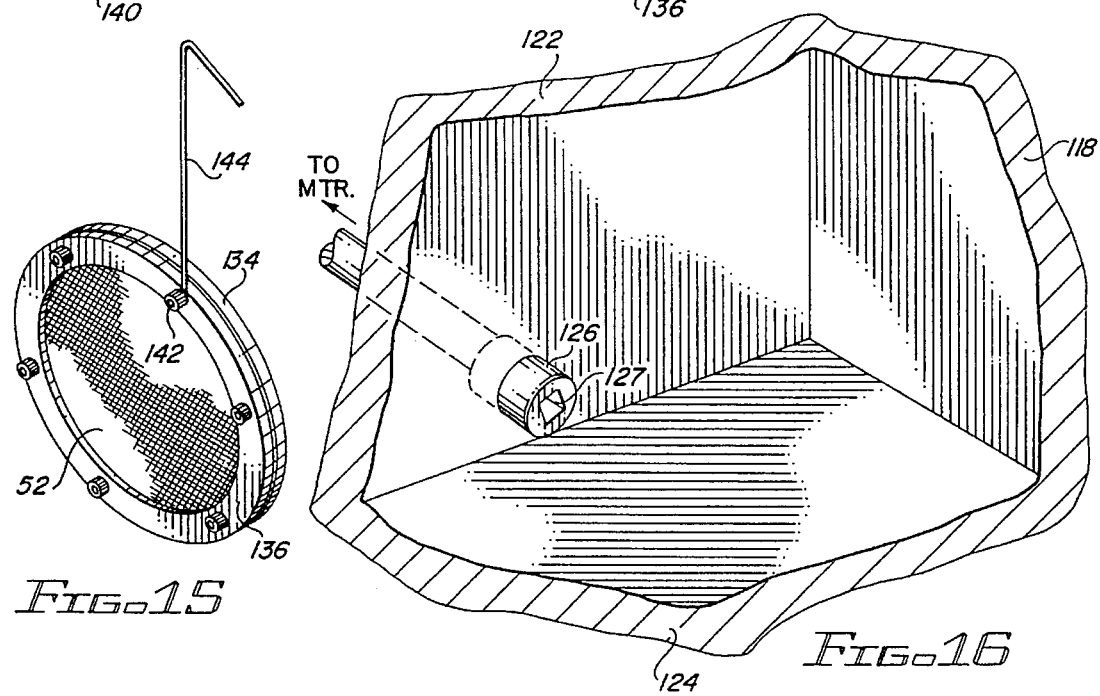

PROCESS OF UNIFORMLY EXPANDING POLYMER FILM

This is a division of application Ser. No. 977,562 filed on Nov. 17, 1992 and now U.S. Pat. No. 5,321,109.

BACKGROUND OF THE INVENTION

1. Field of the Invention

The present invention relates generally to apparatus for stretching expandable polymer films such as PTFE films, and more particularly, to an apparatus and method for stretching and expanding polymer films in multiple directions to more uniformly expand such films.

2. Description of the Relevant Art

Polytetrafluoroethylene (PTFE) is an expandable polymer which finds many uses in medicine and industry. As PTFE is stretched during expansion, it forms a porous microstructure of nodes and fibrils. The direction in which the PTFE is stretched may affect the tensile strength of the resulting tube or film as measured in different directions relative to the direction in which the material was expanded.

It is known to stretch PTFE material along a single expansion axis, or uniaxially. It is also known to stretch PTFE along two different axes. For example, U.S. Pat. No. 4,187,390 to Gore discloses the formation of expanded tubes and films made of PTFE. In one example described in such patent, a PTFE film measuring 4" by 4" was stretched to a 16" by 16" film by stretching the film biaxially. The patent specification states that biaxial stretching was performed on a "pantograph"; in describing the use of such pantograph, the patent specification states that the "4"–4" film was gripped on each side by 13 actuated clamps, which moved apart uniformly on a scissor mechanism."

In addition, U.S. Pat. No. 4,304,010 to Mano describes a prosthetic vascular graft made of PTFE expanded both longitudinally and radially; Mano describes this process as biaxial stretching of the PTFE tube.

PTFE can be stretched to many times its original dimensions. Prior to expansion, the extruded PTFE film is typically heated to approximately within the range of 225–300 degrees Centigrade. Upon reaching such temperature, the film is expanded by stretching to a desired dimension. Following expansion, the PTFE film is heated to a higher sintering temperature of approximately 375 degrees Centigrade or higher to lock the crystalline structure to its expanded dimensions. During this sintering step, the expanded film must be held to its expanded dimensions, or the film will contract partially back toward its pre-expanded shape.

When PTFE films are used for medical/surgical applications, manufacturers and users of PTFE products are often concerned with both tensile strength and suture tear resistance. Tensile strength is a measure of how hard the PTFE material can be stretched along a particular axis before the material breaks. Suture tear resistance is a measure of how much force can be applied to a suture that has been sewn through the PTFE material before such force tears a hole in the PTFE material. Both tensile strength and suture tear resistance can be sensitive to the axis along which expansion was performed during processing of the PTFE material.

When PTFE materials are used as implantable prosthetic devices, such as vessel repair patches or grafts, the surgeon may place the patch or graft in a variety of different orientations, and there is no guarantee that sutures sewn through such PTFE material will necessarily be oriented in the direction of maximum suture tear resistance. For example, if a PTFE film is used as a vessel repair patch, the physician sometimes cuts the patch from a larger film to provide a patch of customized dimensions, and the manufacturer does not know, and can not predict, which way the physician will orient the film when trimming the final patch. Consequently, it would be desirable to produce PTFE films that are expanded in such a way that their characteristics, such as tensile strength and suture tear resistance, are more uniform and not as dependent upon the particular axis or orientation along which the stress forces are applied.

Accordingly, it is an object of the present invention to provide a simple and inexpensive apparatus to stretch and expand films of PTFE and like materials in a multitude of directions outwardly from the center of the original film to provide a multi-directional expansion of the film.

It is a another object of the present invention to provide such an apparatus which conveniently allows the expanded film to be sintered following expansion.

It is still another object of the present invention to provide a method of uniformly expanding PTFE films in a multitude of directions to provide a multi-directional expansion of the film.

It is a still further object of the present invention to provide PTFE films exhibiting substantially uniform tensile strength and suture tear resistance irrespective of the orientation of the film relative to the stress forces being applied.

Still another object of the present invention is to be able to perform the expansion of such film in a sealed oven of relatively small size to closely control the temperature of the film during the expansion process while conveniently maintaining control over the rate at which the film is expanded.

Yet another object of the present invention is to provide apparatus adapted to separately expand a plurality of PTFE films, which expanded films can then be simultaneously sintered in a sintering oven.

A further object of the present invention is to provide an expansion apparatus which is relatively inexpensive to produce and use, yet which uniformly expands a polymer film.

A still further object of the present invention is to provide such an expansion apparatus wherein the expanded film can be easily and quickly locked in its expanded condition and removed from the expansion apparatus prior to sintering.

These and other objects of the invention will become more apparent to those skilled in the art as the description of the present invention proceeds.

SUMMARY OF THE INVENTION

Briefly described, and in accordance with a preferred embodiment thereof, the present invention provides an apparatus for uniformly expanding a polymer film in multiple directions outwardly from the center of the film, and includes a number N of symmetrically-disposed expansion arms, each of the expansion arms being pivotally mounted for pivoting one end of each expansion arm toward or away from the center of the film to be expanded. The apparatus includes a corresponding number N of film gripping members each adapted to releasably engage a peripheral portion of the film to be expanded. Each film gripping member is pivotally secured to an end of an associated expansion arm for movement toward or away from the center of the film, and the film gripping members are symmetrically disposed about a central axis coincident with the center of the polymer film.

The apparatus includes a pivot drive mechanism for simultaneously pivoting the group of expansion arms in a direction for uniformly moving the ends of the expansion arms to which the gripping members are secured away from the center of the film. Each of the film gripping members pivots to face the center of the film as its associated expansion arm pivots away from the center of the film to continuously maintain the stretching force applied by each film gripping member along a radial path extending outwardly from the center of the film. Preferably, the radial path along which each film gripping member applies its stretching force rotates as its associated expansion arm pivots outwardly away from the center of the film. The pivot drive mechanism maintains the film gripping members equidistant from the center of the film during the expansion of the film.

In the preferred embodiment of the above-summarized apparatus, each expansion arm is pivotally secured to a base proximate the end thereof opposite the gripping member. The pivot drive mechanism includes a rotatable drive ring to which each of the expansion arms is coupled between the opposing ends thereof. Each expansion arm has a slot formed therein between the opposing ends thereof; the drive ring includes a number N of engagement pins symmetrically disposed about the ring, and each of the engagement pins engages a slot of one of the expansion arms for sliding engagement therewith. As the drive ring is rotated in a first direction, each of the expansion arms is pivoted away from the center of the film to simultaneously move the gripping members through an arc outwardly away from the center of the film.

The drive ring is preferably mounted to a geared shaft concentric with the drive ring, and a power source engages the geared shaft for rotating said geared shaft in order to rotate the drive ring. In order to permit the polymer film to be maintained at an elevated temperature during expansion, the apparatus preferably includes an oven having insulated walls, and one of the insulated walls includes a rotatable drive member extending therethrough. The rotatable drive member has a first end accessible from outside the oven for coupling to a drive motor external from the oven; the rotatable drive member also has an opposing second end accessible from the inside wall of the oven for coupling to the geared shaft to rotate the drive ring. The external drive motor rotates the geared shaft at a substantially constant speed, whereby the rate at which the gripping members move away from the center of the film continuously increases the as the gripping members move further away from the center of the film.

Ideally, the apparatus includes a clamping device for clamping the film following expansion, while allowing the film to be removed from the gripping members. The clamping device contacts the film internal from the peripheral edges of the film for allowing the peripheral edges of the film to be released from the film gripping members. The clamping device retains the film in its expanded condition for sintering at an elevated temperature. In one preferred form, the clamping device includes first and second rings applied to opposing faces of the expanded film. The first and second clamp rings are releasably fastened to each other to lock the film in its expanded state before the film is released from the gripping members.

Another aspect of the present invention is a process for uniformly expanding a polymer film in multiple directions, wherein the periphery of the film is secured to a number of symmetrically-disposed film gripping members each being equidistant from the center of the film. Each of the film gripping members is simultaneously rotated through an arc away from the center of the film to stretch and expand the film while maintaining the film gripping members equidistant from the center of the film. As the film gripping members are rotated away from the center of the film, each film gripping member is pivoted to continuously face the center of the film in order to maintain the pulling force exerted by each film gripping member radial relative to the center of the film. In carrying out such process, each film gripping member can be pivotally secured to an associated expansion member for ensuring that the pulling force exerted by the film gripping member is directed radially relative to the center of the film. The process preferably includes the step of trimming the periphery of the film to correspond with the pattern of film gripping members before such film gripping members are expanded. In the preferred embodiment of the process, the rate at which each film gripping member moves away from the center of the film continuously increases as each film gripping member is rotated further away from the center of the film.

In practicing such process, the polymer film may advantageously consist of extruded PTFE. The process preferably includes the step of heating the extruded PTFE film to a temperature in the range of 200–300 degrees Centigrade before expanding the film. The extruded PTFE film may initially include a lubricant, and the process preferably includes the steps of folding the extruded film upon itself, rolling the folded PTFE film between a pair of rollers, and drying the lubricant from the rolled PTFE film before securing the film to the film gripping members.

The process of the present invention also preferably includes the step of locking the expanded film in its expanded dimensions, and heating the locked film at a temperature above 350 degrees Centigrade to sinter the PTFE film. This locking step includes the step of applying a clamping mechanism to opposing faces of the expanded film before releasing the expanded film from the film gripping members.

BRIEF DESCRIPTION OF THE DRAWINGS

FIG. 3 is a top view of the expansion apparatus shown in FIG. 1 but showing the expansion arms being rotated toward their final expanded positions.

FIG. 5 is a close-up view of the film clamping members of the expansion apparatus of FIG. 1 prior to expansion, and further illustrating a grid drawn upon the PTFE film to be stretched.

FIG. 7A is a close-up view of the film clamping members of an alternate embodiment of the present invention using only four radial expansion arms.

FIG. 12 illustrates an octagonal-shaped template for trimming an unexpanded PTFE film to prepare for expansion using the expansion apparatus of FIG. 1.

FIG. 13 is a perspective view of an expanded PTFE film in conjunction with upper and lower retainer rings used to maintain the expanded dimensions of the stretched film prior to sintering.

FIG. 14 is a side view of the expanded PTFE film retained by the upper and lower retainer rings shown in FIG. 13.

FIG. 15 is a perspective view of the stretched film maintained in its expanded condition by the retainer rings and suspended by a hook for placement in a sintering oven.

FIG. 16 is a partial perspective view of an expansion oven wall modified to receive a rotatable drive member for allowing the PTFE film to be expanded in an oven using the apparatus of FIG. 1 at a controlled rate and temperature.

Yet another aspect of the present invention is the uniformly expanded PTFE film which results from practicing the above-described process.

DETAILED DESCRIPTION OF THE PREFERRED EMBODIMENT

Figure 1:
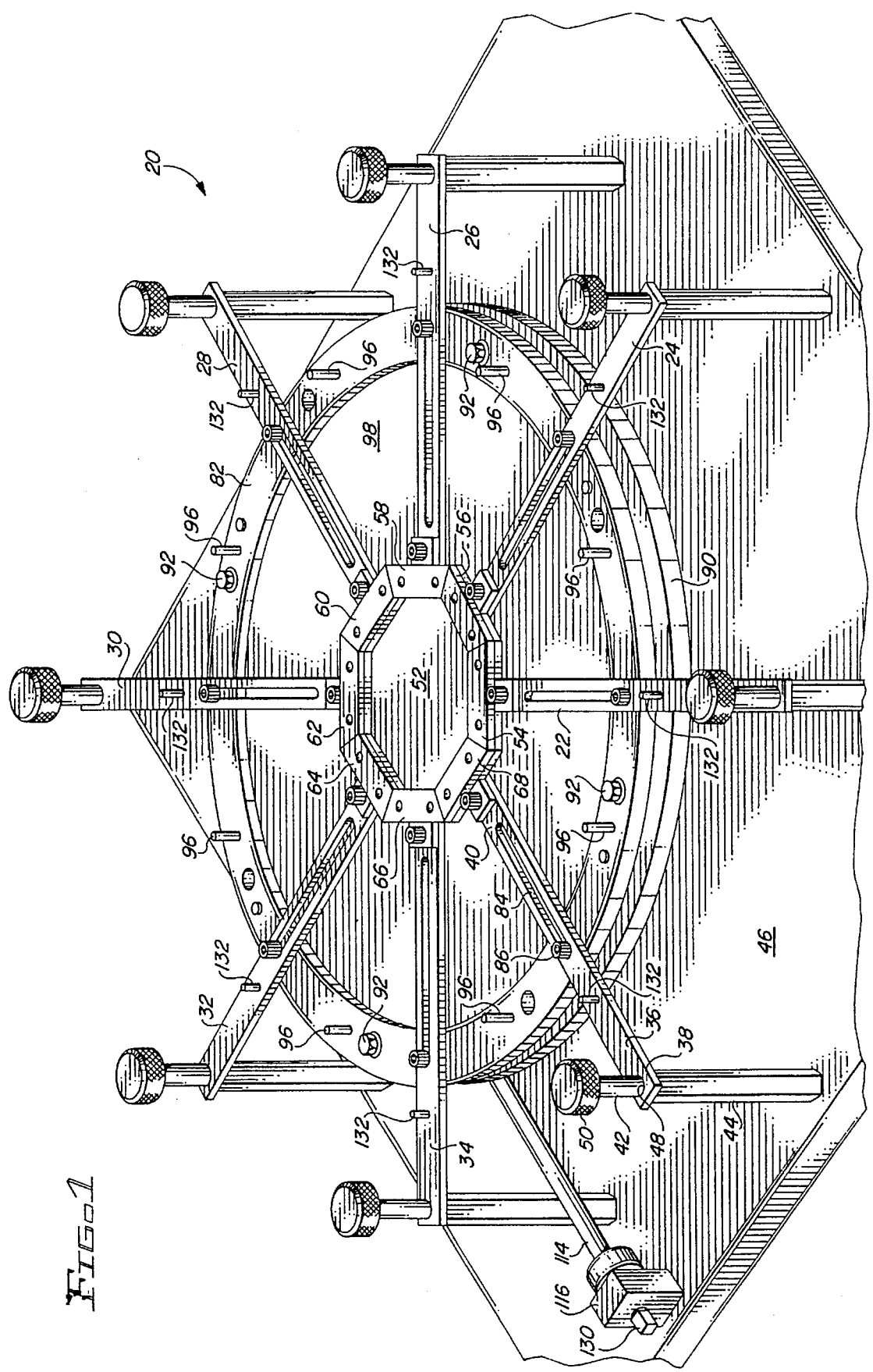
FIG. 1 is a perspective view of an eight-arm radial expansion apparatus for multi-directional expansion of a PTFE film, and illustrating the radial expansion arms in their initial starting position.

A preferred form of apparatus for uniformly expanding a PTFE polymer film in a multitude of directions in accordance with the teachings of the present invention is designated generally in FIG. 1 by reference numeral 20. Expansion apparatus 20 includes a plurality of eight expansion arms designated by reference numerals 22, 24, 26, 28, 30, 32, 34, and 36. Expansion arms 22–36 are symmetrically-disposed about the center of the apparatus. As shown in FIG. 1, each expansion arm initially extends radially toward the center of the apparatus, and each expansion arm is offset at an angle of 45 degrees from the leading and trailing expansion arms. Each expansion arm has first and second opposing ends. For example, as shown in FIG. 1, expansion arm 36 has a first outer end 38 and a second opposing inner end 40.

The first, or outer, end of each expansion arm is pivotally mounted for pivoting the opposing second inner end of the expansion arm toward or away from the center of the apparatus. For example, in FIG. 1, the first end 38 of expansion arm 36 is pivotally secured by a pivot pin 42 to a pedestal 44 which is in turn secured to a common base plate 46. Similarly, seven additional pedestals are secured to and spaced about base plate 46 equiangularly and equidistant from the center of base plate 46 for pivotally supporting the other seven expansion arms 22–34.

Pivot pin 42 has a smooth upper shaft which passes through a similarly-sized aperture 48 in the first end 38 of expansion arm 36; the first end of expansion arm 36 is free to rotate about the smooth upper shaft of pivot pin 42. The lower end (not shown) of pivot pin 42 is of reduced diameter and slips into a bore formed in the upper end of pedestal 44 for releasably securing first end 38 of expansion arm 36 to pedestal 44. The upper end of pivot pin 42 includes an enlarged knurled knob 50 to allow a user to conveniently secure or release expansion arm 36 to or from pedestal 44, as desired.

Shown in the center of FIG. 1 is a polymer film 52 formed of extruded PTFE. The extruded film is initially trimmed to an eight-sided octagonal shape. An octagonally-shaped steel template 53 is shown in FIG. 12 for such purpose. A plurality of eight film gripping members, designated by reference numerals 54, 56, 58, 60, 62, 64, 66, and 68 are symmetrically disposed about the central axis of the apparatus coincident with the center of PTFE film 52. Referring briefly to FIG. 3, the center of the film, and the central axis of the apparatus, are designated by intersection point 51. Film gripping members 54–68 are pivotally secured to the second, or inner, end of expansion arms 22–36, respectively. Each of the expansion arms 22–36 is of equal length, and each of the film gripping members is equidistant from the central axis of the apparatus, and equidistant from the center of the PTFE film.

Figure 2:
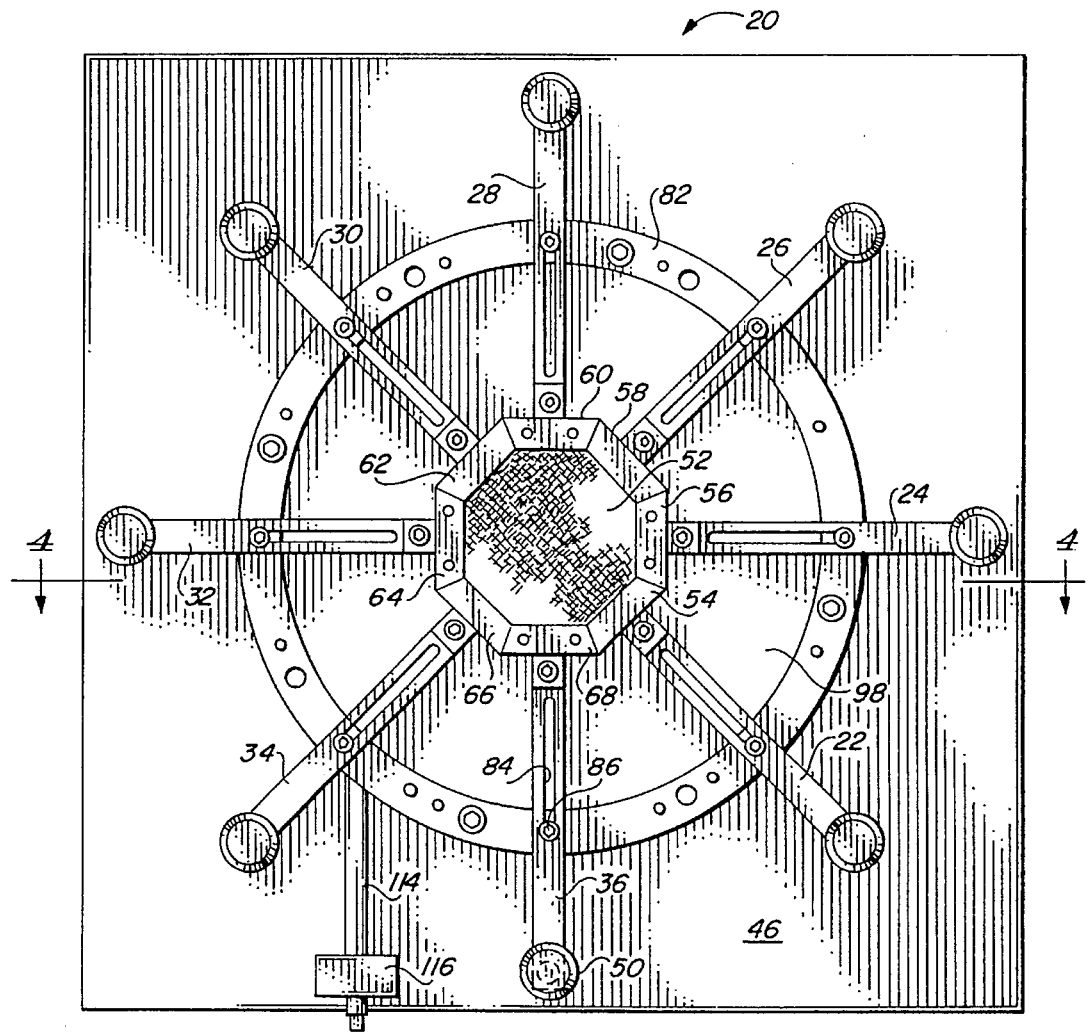
FIG. 2 is a top view of the expansion apparatus shown in FIG. 1.
Figure 4:
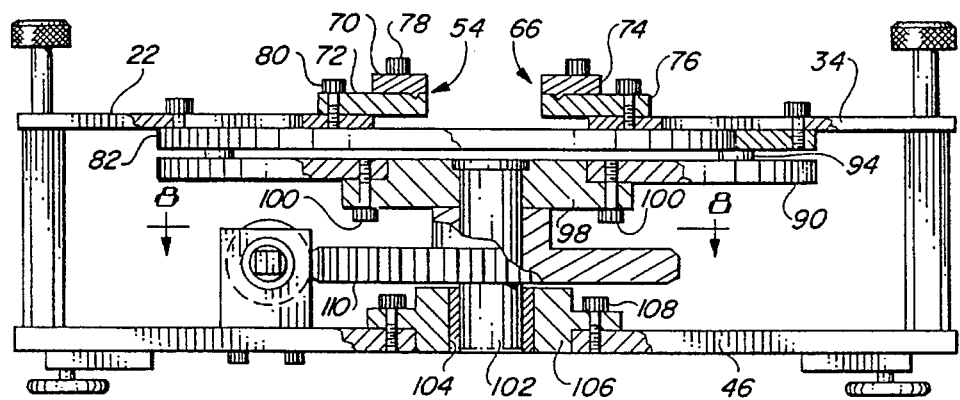
FIG. 4 is a side view of the expansion apparatus shown in FIG. 1 and illustrating the drive mechanism for uniformly rotating and expanding the expansion arms of such apparatus.

Each of film gripping members 54–68 is adapted to releasably engage a peripheral portion of PTFE film 52. Referring to FIGS. 2 and 4, film gripping member 54 includes an upper clamp bar 70 and a lower clamp bar 72. Similarly, film gripping member 66 includes an upper clamp bar 74 and a lower clamp bar 76. Lower clamp bar 72 has an inwardly extending ridge, while upper clamp bar 70 has a mating downwardly depending tooth; the tooth and mating ridge firmly grasp the PTFE film therebetween. Releasable hex head screws 78 secure upper clamp bar 74 to lower clamp bar 72 after the peripheral portion of the PTFE film is engaged therebetween.

As described above each film gripping member is pivotally secured to the inner end of its associated expansion arm. For example, as shown in FIG. 4, lower clamp bar 72 of film gripping member 54 is pivotally secured to the inner end of expansion arm 22 by a hex head bolt 80. Bolt 80 has a smooth upper bore for engaging a correspondingly sized aperture (not shown) in lower clamp bar 72 of film gripping member 54. Accordingly, film gripping member 54 can freely pivot about bolt 80. The lowermost end of bolt 80 is threaded to engage a threaded hole formed in the inner end of expansion arm 22.

As described above, apparatus 20 includes a pivot drive mechanism for simultaneously pivoting the group of expansion arms 22–36 in a direction for uniformly moving the inner ends of such expansion arms, along with their associated gripping members, away from the center of the film. This pivot drive mechanism preferably includes a rotatable pivot drive ring 82 shown in FIGS. 1, 2 and 4. Each of expansion arms 22–36 is slidingly coupled to rotatable ring 82 between the opposing outer and inner ends thereof. For example, expansion arm 36 includes a longitudinally extending slot 84 which extends from approximately the midpoint of expansion arm 36 to a point proximate inner end 40 thereof. Mechanical coupling between ring 82 and expansion arm 36 is effected by a hex head engagement stud 86 which slides within slot 84. The lowermost end of stud 86 is threaded to engage a threaded hole (not shown) formed in ring 82. The uppermost portion of stud 86 is smooth for sliding engagement along slot 84. Each of the other expansion arms is coupled to ring 82 in a similar fashion by similar engagement studs which are disposed equiangularly about the upper surface of ring 82. With reference to FIG. 2, those skilled in the art will appreciate that, as ring 82 is rotated counterclockwise, each expansion arm is forced to rotate in a clockwise direction about the pivot point at its outer end, thereby causing the inner end of each expansion arm, and hence each gripping member, to simultaneously move through a circular arc away from the center of the apparatus, and away from the center of the film, as generally indicated by FIG. 3. Likewise, subsequent rotation of ring 82 in the clockwise direction tends to force the gripping members to return back to their initial pre-expanded position shown in FIG. 2.

Figure 9:
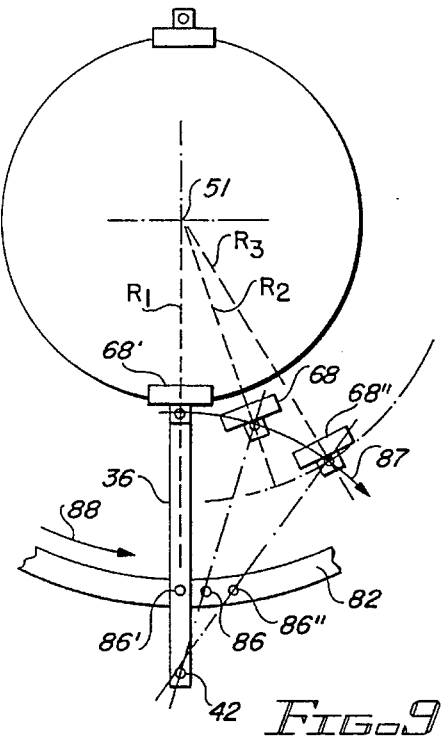
FIG. 9 is a schematic drawing of one film clamping member and its associated radial expansion arm, and illustrating the manner in which the expansion force is maintained in a radial direction from the center of the film.

As shown best in FIGS. 3 and 9, each film gripping member moves outwardly from the center 51 of the PTFE film along an arcuate, non-radial path in the particular embodiment shown. This arcuate path is shown by the arrow designated 87 in FIG. 9. In FIG. 3, the initial position of expansion arm 36 and associated gripping member 68 are shown in dashed outline by the components labelled 36' and 68', respectively. As ring 82 rotates counterclockwise, as indicated by arrows 88, expansion arm 36 and gripping member 68 move to the solid-line positions shown in FIG. 3; note that pin 86 has begun to advance through slot 84 of expansion arm 36. Continued rotation of ring 82 causes expansion arm 36 and gripping member 68 to advance to the dashed line positions indicated by 36" and 68", respectively. Thus, while gripping member 68 is initially pulling on the film along a radius passing through pivot pin 42, continued rotation of drive ring 82 results in the rotation of the pulling force exerted by gripping member 68 toward a radius displaced from the initial radial path by an angle of approximately 45 degrees.

As further demonstrated in FIGS. 3 and 9, gripping member 68 always faces the center of the film throughout the arcuate movement of expansion arm 36. Gripping member 68 is pivotally secured to the inner end of expansion arm 36, and this pivotal connection continuously maintains the stretching force applied by each film gripping member along a radial path extending outward from the center of the film. Referring to FIG. 9, the original radial path is designated $R_1$. As ring 82 rotates, gripping member 68 moves to exert a radial stretching force along the radial path designated $R_2$. Further rotation of ring 82 moves gripping member 68 further away from center 51 of the PTFE film, so that the stretching force is exerted along the radial path designated $R_3$. The angular rotation of such radial path, from $R_1$ through $R_2$ to $R_3$, as the gripping member moves outwardly is believed to contribute to the uniform expansion of the film. Each of the other gripping members undergoes the same motion, whereby each of the film gripping members is maintained equidistant from the center 51 of the film.

As described above, circular drive ring 82 is rotated to simultaneously move the expansion arms and gripping members. The apparatus for causing drive ring 82 to rotate will now be described with reference to FIGS. 1–4. Drive ring 82 is secured to a lower ring 90 by a series of spaced bolts, like those designated 92 in FIG. 1. As shown in FIG. 4, spacer washers like that designated 94 inserted between ring 82 and lower ring 90 cause drive ring 82 to be spaced slightly above and out of contact with lower ring 90. Limit pins 96 prevent expansion arms 22–36 from being pivoted so far as to contact bolts 92.

As shown in FIG. 4, lower ring 90 is secured to a support plate 98 by attachment bolts 100. Support plate 98 is, in turn, supported by a vertically mounted support shaft 102 journaled in bushing 104. Support shaft 102 is concentric with drive ring 82 and concentric with the central axis of the expansion apparatus. Bushing 104 is contained within cylindrical support 106 which is secured over a central hole in base plate 46 by bolts 108. A horizontal circular gear 110 is secured over support shaft 102 and engages a worm gear 112 shown best in FIG. 8. Worm gear 112 is formed upon horizontal drive shaft 114 which is rotatably supported on either side of worm gear 112 by bushing blocks 116 and 118, each of which is secured to base plate 146. Rotation of drive shaft 114 is coupled by worm gear 112 to toothed gear 110, which in turn causes vertical shaft 102, lower ring 90, and drive ring 82 all to rotate in response.

As noted above, expansion of PTFE films is typically carried out at temperatures well above room temperature. While it is possible to heat such films with hot air guns, better temperature control can be achieved if the expansion can be performed in an insulated oven with insulated walls and a controllable heat source. Accordingly, it is desirable to place expansion apparatus 20 in an oven with insulated walls before the temperature of the film is raised to the desired temperature for expansion. Within FIG. 3, expansion apparatus 20 is shown within an insulated oven including side walls 118 and 120 and rear wall 122. The oven may also include an insulated door (not shown), as well as a floor 124 (see FIG. 16) and a ceiling (not shown). A power coupler extends through rear wall 122 of the oven. As shown in FIG. 16, the rotatable power coupler includes a shaft 126 having a square recess 127 formed in the end of the shaft internal to the oven. The portion of power coupling shaft external to the oven is coupled to an external electrical motor 128, the speed and duration of which can be programmed.

Figure 8:
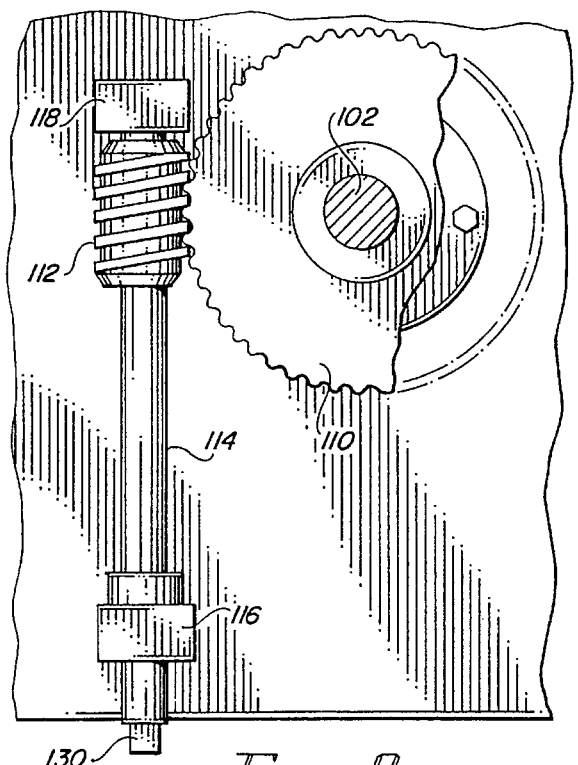
FIG. 8 is a bottom view of the expansion apparatus of FIG. 1 showing the drive gear for uniformly rotating the expansion arms.

As shown in FIGS. 1 and 8, the end 130 of horizontal drive shaft 114 that protrudes from bushing block 116 is splined in a square shape for being removably received within the squared recess 127 of power coupling shaft 126 shown in FIG. 16. Accordingly, in using the present apparatus, the unexpanded film can be secured to the group of gripping members, and the loaded expansion apparatus can then be placed into the oven, being careful to engage splined end 130 of driveshaft 114 into square recess 127, before closing the oven door and raising the temperature inside the oven. After the desired temperature is achieved, motor 128 is operated to controllably rotate drive ring 82, thereby expanding the film. Motor 128 can be operated at a constant speed for better control; if motor 128 is operated at constant speed, driveshafts 114 and 102 also rotate at a substantially constant speed. However, the radial pull rate at which the gripping members move away from the center of the film, if expressed in terms of inches per second, continuously increases as the as the gripping members move further away from the center of the film, as is apparent from the schematic drawing of FIG. 9. This increase in radial rate of stretching is desirable as expansion rates are often specified in percentage expansion over unit time, rather than in inches per unit time.

Once the film is expanded in the manner explained above, the expanded film must be sintered. This sintering operation could be performed in the same oven used for the expansion, if desired. However, it may be preferred to first remove the expanded film from the expansion oven, and to sinter the film in a separate oven. This latter method provides the advantage of being able to use the first oven exclusively for expansion, and being able to expand a new film without waiting for the first expanded film to be sintered. In addition, several expanded films can all be sintered in the second oven at the same time, thereby minimizing the number of sintering operations that need to be performed.

One method of locking the film in its expanded condition prior to sintering while removing the film from the expansion apparatus is to apply one or more lock bars (not shown) to lock the expansion arms in place relative to drive ring 82. The lock bars have holes drilled in each thereof. The hole at one end of the lock bar fits over one of the pins 96 extending upwardly from drive ring 82. The hole at the opposite end of the lock bar is fitted over one of the pins 132 (see FIG. 1) extending upwardly from each of the expansion arms. After one or more of the lock bars are applied, drive ring 82 and expansion arms 22–36 can be removed from the remainder of the expansion apparatus, as by unfastening pivot pins 42 and drive ring bolts 92. The locked expansion arms and drive ring can then be placed in the sintering oven, thereby avoiding the need to expose the bushings and/or bearings of the expansion apparatus to the high temperatures of the sintering oven.

However, a preferred method of locking the expanded film in its expanded condition for removal from the expansion apparatus prior to sintering is shown in FIGS. 13 and 14. Within FIG. 13, the expanded film 52 is shown still grasped by expanded gripping members 22–36. A first clamping ring 134 is supported above expanded film 52, and a second clamping ring 136 is placed below film 152, as shown in FIG. 13. First clamping ring 134 has a series of four smooth bore holes 138, and second clamping ring 136 has a second series of four threaded holes 140. The two clamping rings 134 and 136 are moved toward each other, while aligning the two series of holes 138 and 140; the rings are held against each other while fastening bolts 142 are inserted through holes 138, through film 52, and into threaded holes 140 to positively secure the rings together, with the expanded film clamped therebetween.

The diameters of clamping rings 134 and 136 are selected to be slightly smaller than the size of the expanded film so that the rings can be installed while the film is still grasped by film gripping members 54–68. Accordingly, once the clamping rings are secured, as shown in FIG. 14, the portion of the film outside of the rings may be cut free to allow the locked expanded film to be placed in a sintering oven with other expanded film. As shown in FIG. 15, a suspension hook 144 can be secured around one of the fastening bolts 142 to suspend the locked expanded film from a rack in a sintering oven. After the clamped film is cut from the expansion apparatus, the remaining peripheral portions of the expanded film are released from the film gripping members by removing hex head screws 78 to release upper clamp bar 74 from lower clamp bar 72 in each film gripping member, in preparation for the next film expansion cycle. This procedure avoids the need to expose the expansion arms and drive ring 82 to the higher temperatures of the sintering oven.

Another aspect of the present invention relates to a process for uniformly expanding a polymer film, such as PTFE, in multiple directions. In carrying out the preferred process using PTFE as the polymer, the PTFE resin is mixed with a lubricant to form a paste and is extruded into a thin film using known processing. U.S. Pat. No. 4,187,390 to Gore discloses one method of extruding a thin PTFE film, and the specification of such patent is hereby incorporated by reference. This initial step of extruding the PTFE film is shown as step 146 in the flowchart of FIG. 10.

To enhance the uniformity of the extruded film, a calendering process is preferably used prior to expansion of the film. This calendering process is signified by step 149 in FIG. 10 and is demonstrated in FIG. 11. The calendering process is performed before drying the lubricant from the extruded PTFE film. First, the initially extruded PTFE film 147 is rolled between a pair of smooth rollers 148 and 150, thinning the extruded film from an initial thickness of approximately 1.3 mm. to 0.9 mm. The rolled film may then be rotated 90 degrees and sent back through the rollers, if desired. The rolled film is then folded on itself along the direction in which it was initially sent through rollers 148 and 150, as indicated by arrow 152 in FIG. 11, thereby increasing the thickness of the folded film. The folded film is then sent back through rollers 148 and 150, with the fold line extending in the direction of travel through the rollers, as indicated by arrow 154 in FIG. 11, again thinning the rolled film. The resulting film is then folded over itself, this time with the fold line extending perpendicular to the direction of travel through the rollers, as indicated by arrow 156 in FIG. 11. Finally, the film 147 is run through rollers 148 and 150 again, this time with the fold line oriented perpendicular to the direction of travel through the rollers. The lubricant is then dried from film 147 prior to expansion of the film by heating the film to approximately 40 degrees Centigrade for approximately one hour. The above-described calendering process is carried out at room temperature and provides a starting film of more uniform thickness, much like rolling pie dough with a rolling pin. The thickness of the resulting PTFE film 147 varies in accordance with the number of calendering operations, but typically ranges between approximately 0.9 mm. and 0.3 mm. thick. For example, if the PTFE film will be used to form vascular patches, a calendered thickness of 0.6 mm. to 0.8 mm. is preferably produced to provide a resulting sintered film thickness of from 0.4 mm. to 0.6 mm.

The calendered film is then ready for expansion. The rectangular film is initially trimmed to the shape of the gripping members of the expansion apparatus. For example, if the expansion apparatus of FIG. 1 is used, the film is trimmed to an octagonal shape using the template 53 shown in FIG. 12. Template 53 is slightly larger in size than the area surrounded by film gripping members when the expansion arms are initially directed toward the center of the apparatus. The peripheral edges of the film are then secured to the film gripping members between upper clamp members 70 and lower clamp members 72 (see FIG. 4). The expansion apparatus of FIG. 1 is then placed in the oven, ensuring that the splined end 130 of drive shaft 114 is coupled with recess 127 of power coupler shaft 126. The oven door is closed, and the temperature in the oven is raised to a temperature approximately in the range of 200–300 degrees Centigrade before expanding the film, and preferably in the range of 225–275 degrees Centigrade. The expansion operation can be carried out at atmospheric pressure.

The unexpanded film is incubated in the oven for 5–10 minutes after the oven temperature has stabilized to ensure that the film has come up to the desired temperature. After the incubation period has elapsed, a timer and a speed control (not shown) attached to motor 128 (see FIG. 3) are set to operate the motor to expand the film. The timer and speed control are set to fully expand the film over a 15 to 30 second duration. The PTFE film is expanded to be approximately three to four times its original size. For example, an unexpanded film measuring approximately 2.5 inches square might be expanded to a finished size of approximately 8.5 inches square.

Figure 10:
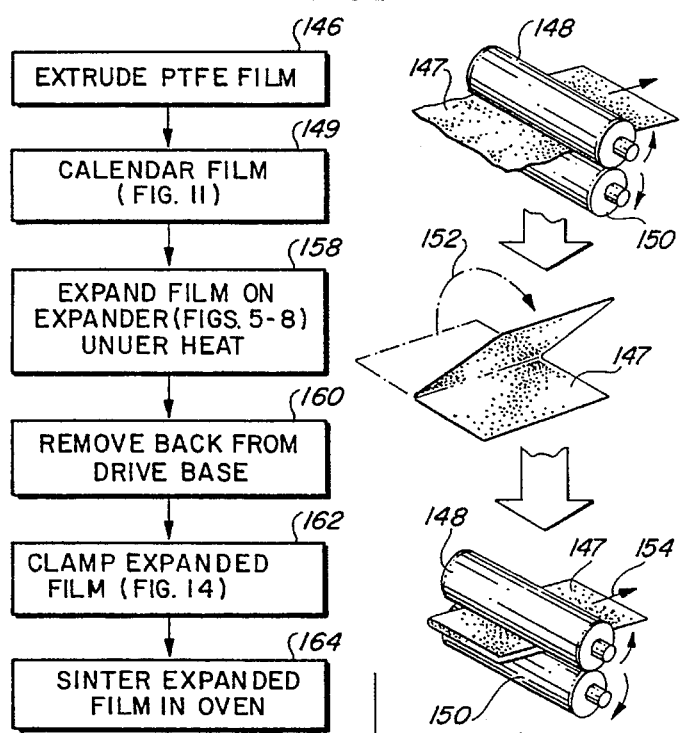
FIG. 10 is a flow chart summarizing the processing steps used in the preferred embodiment of the present invention for making expanded PTFE films having substantially uniform tensile strength and suture tear resistance characteristics.
Figure 11:
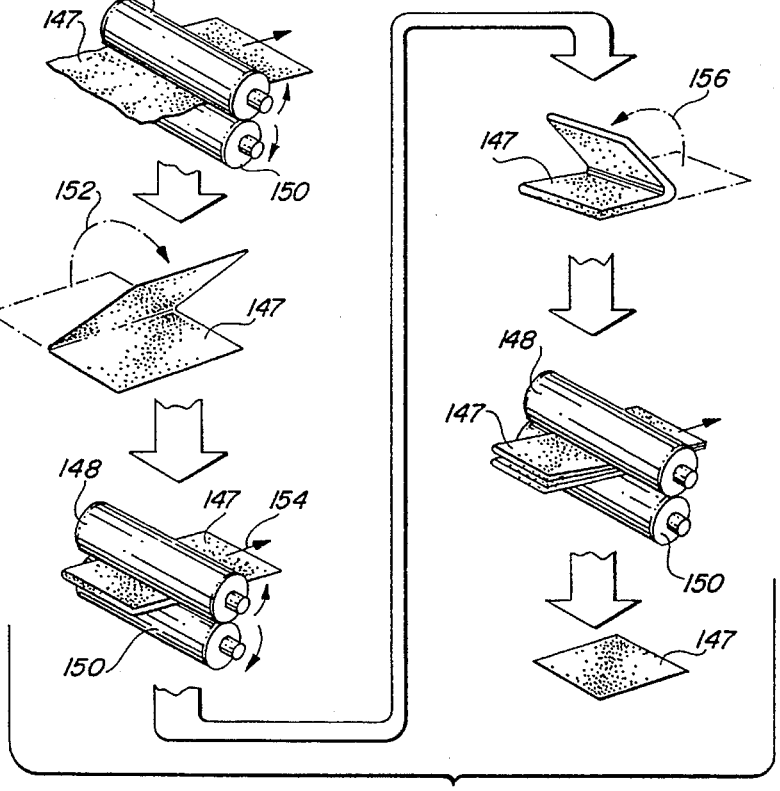
FIG. 11 is a step-by-step illustration of a calendering and folding process for preparing a PTFE film for radial expansion using the present invention.

The aforementioned steps for expanding the film are collectively represented by box 158 in the flowchart of FIG. 10. The expansion operation does not significantly affect the thickness of the PTFE film. As noted earlier, the expansion apparatus tends to stretch the film slowly at first; as the expansion arms pivot further away from the center of the film, the gripping members rotate through an arc, and the linear rate of travel away from the center of the film accelerates. Moreover, because the gripping members are pivotally secured to the inner ends of the expansion arms, the pulling force exerted by each film gripping member is maintained radial relative to the center of the film. In addition, because the gripping members rotate through an arc, the radial direction along which each gripping member exerts its pulling force is continuously rotated.

The next step in the process is to remove the expansion apparatus from the expansion oven and to clamp the expanded film prior to sintering. The procedure for locking the expansion arms to drive ring 82 using lock bars has already been described. The locked expansion arms and drive ring 82 are released from the expansion apparatus, as represented by box 160 in FIG. 10; then, clamp rings 134 and 136 are secured to opposing faces of the expanded film in the manner described above to clamp the expanded film, as denoted by box 162 in FIG. 10. The peripheral portion of the expanded film is cut away from the outer portion of the clamp rings, and the expansion apparatus is reset to receive another film to be expanded. After a number of clamped expanded films have been produced, they are placed in a sintering oven and heated to a temperature above 350 degrees Centigrade to sinter the PTFE film, thereby permanently locking the film in its expanded state. Preferably, this sintering operation is performed at a temperature in the range of 375–400 degrees Centigrade for 8–9 minutes. The final sintering step is represented by box 164 in the flowchart of FIG. 10.

Figure 6:
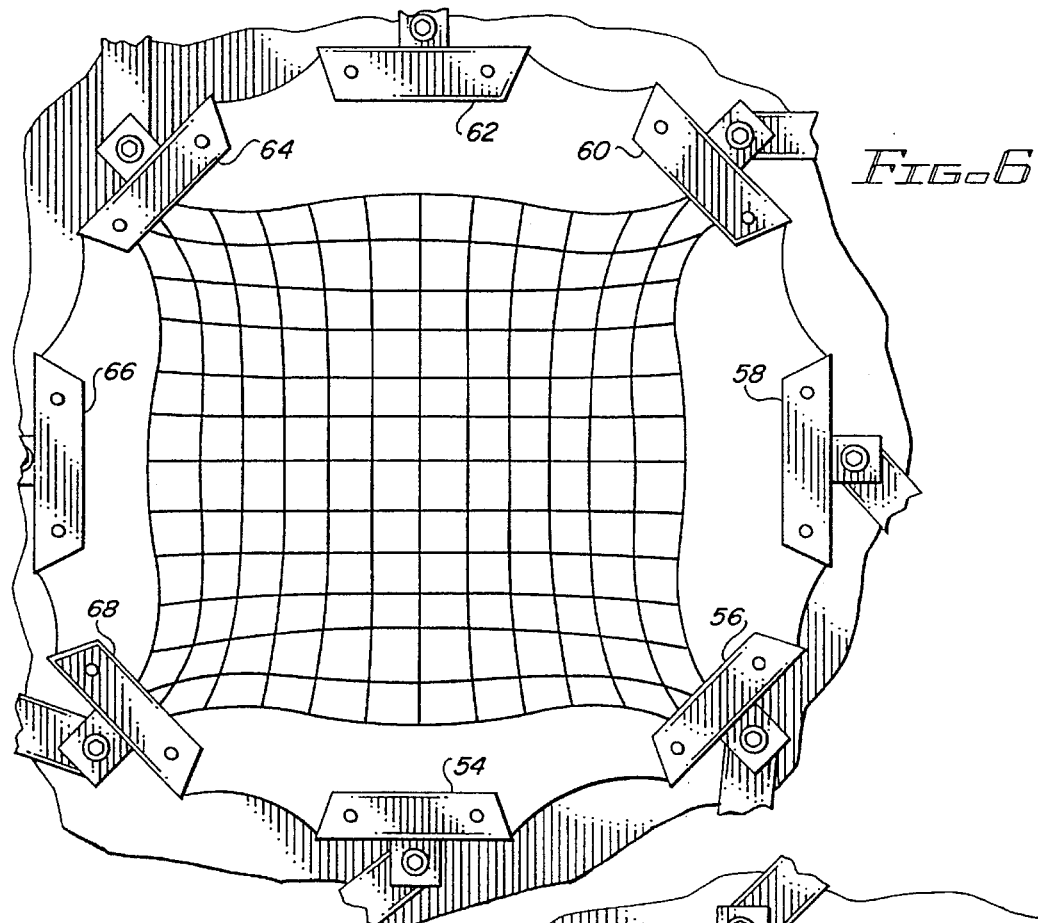
FIG. 6 is a close up view of the film shown in FIG. 5 after the radial expansion arms have been rotated to expand the film.
Figure 7B:
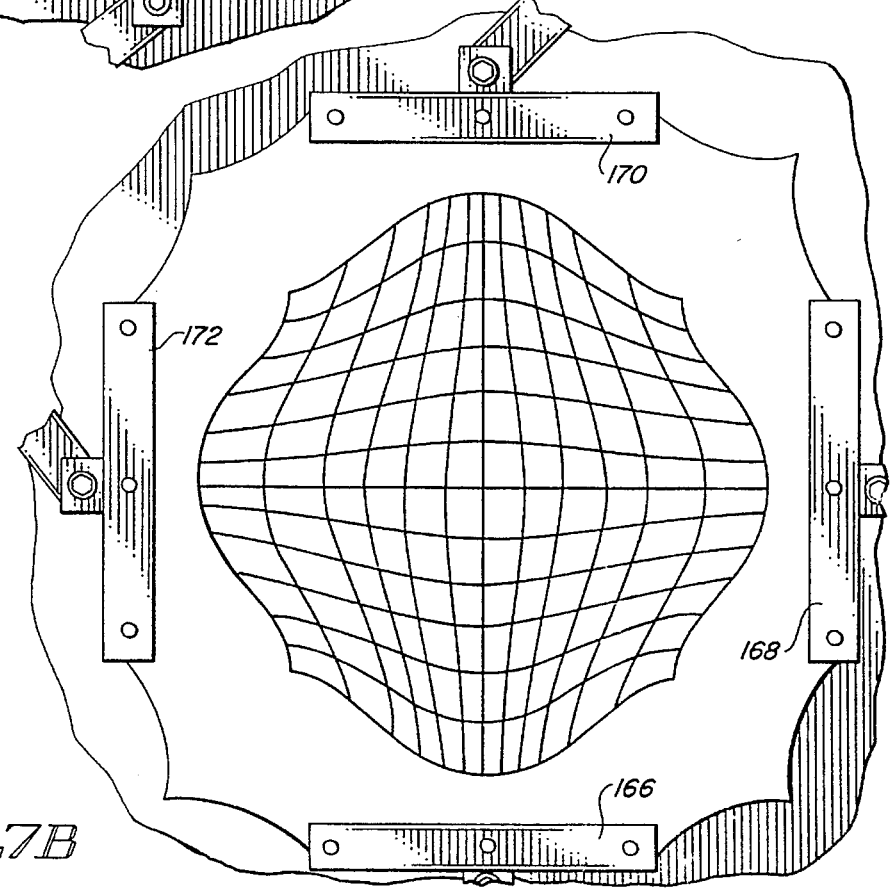
FIG. 7B is a close up view of the film shown in FIG. 7A after the radial expansion arms have been rotated to expand the film.

While the apparatus of the present invention has been described as having eight expansion arms and eight film gripping members, those skilled in the art will appreciate that such apparatus can be made with a different number of expansion arms and gripping members. For example, FIG. 5 is a top view of a PTFE film prior to expansion using an 8-arm expansion machine. The film has been marked with PTFE ink to show a grid prior to expansion. FIG. 7A shows the same PTFE film grasped by a similar machine using only four expansion arms and four gripping members designated 166, 168, 170, and 172. FIG. 6 shows the film of FIG. 5 following expansion using the 8-arm machine. The original grid is still recognizable and the lines of the grid are still relatively straight, indicating relatively uniform expansion in all directions. In contrast, FIG. 7B shows the film of FIG. 7A following expansion using the 4-arm machine. The grid of FIG. 7B is distorted, indicating that the expansion using the 4-arm machine was not as uniform as the expansion using the 8-arm machine.

In addition, tests were performed on PTFE expanded films stretched with the 4-arm and 8-arm machines. Such tests were conducted to determine the suture retention strength of the two expanded films in three different directions, a) the "M" direction corresponding to the longitudinal axis along which the film was initially extruded; b) the "T" direction corresponding to the transverse direction, i.e., perpendicular to the extrusion axis; and c) along an axis bisecting the "M" and "T" directions. The tests were conducted by loading strips of the expanded film cut along the M, T and 45 degree directions into a testing instrument. The test conditions included a suture bite of 2 mm., a pull speed of 5 inches/minute, and a suture hole using a 0.013 inch needle. Peak force prior to tearing was noted. The results of such tests showed that the samples expanded using the 8-arm machine had more uniform suture retention strength when compared along the M, T, and 45 degree directions, as contrasted with the samples produced using the 4-arm machine. The suture retention strength (in Kg.) recorded for such samples is set forth below:

| | Four Arm Machine | | |
|---|---|---|---|
| | M direction | T direction | 45 Degrees |
| Sample 1 | 1.435 ± .252 | 2.663 ± .372 | 2.239 ± .305 |
| Sample 2 | 2.022 ± .650 | 3.036 ± .347 | 2.620 ± .374 |
| Sample 3 | 1.946 ± .484 | 2.816 ± .387 | 2.213 ± .197 |

| | Eight Arm Machine | | |
|---|---|---|---|
| | M direction | T direction | 45 Degrees |
| Sample 1 | 2.139 ± .44 | 1.913 ± .225 | 2.142 ± .211 |
| Sample 2 | 1.726 ± .314 | 2.254 ± .333 | 1.837 ± .285 |
| Sample 3 | 1.798 ± .414 | 2.430 ± .374 | 1.946 ± .375 |

From the data set forth above, it will be noted that the suture retention strength for the samples expanded using the 8-arm machine is much less dependent on orientation than in the case of the samples expanded using the 4-arm machine. It is theorized that the greater the number of expansion arms, the more uniform will be the resulting film.

Those skilled in the art will now appreciate that a simple and inexpensive apparatus has been described for stretching and expanding films of PTFE and like polymer films in a multitude of directions outwardly from the center of the original film to provide a multi-directional expansion of the film. It will also be appreciated that the present invention provides an improved method of uniformly expanding PTFE films in a multitude of directions to provide a multi-directional expansion of the film. The film produced using such apparatus and method exhibits greater uniformity in characteristics such as suture retention strength. While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

We claim:

1. A process for uniformly expanding a polymer film in multiple directions, the polymer film having a center, the process comprising in combination the steps of:

a. securing the periphery of the film to a plurality of symmetrically-disposed film gripping members, each of said film gripping members being equidistant from the center of the film;

b. simultaneously rotating each of the plurality of film gripping members through an arcuate path defining an arc greater than zero degrees away from the center of the film to stretch and expand the film while maintaining said plurality of film gripping members equidistant from the center of the film; and c. maintaining the pulling force exerted by each film gripping member radial relative to the center of the film thereby forming a uniformly expanded polymer film.

2. The process recited by claim 1 wherein the rate at which each film gripping member moves away from the center of the film continuously increases as each film gripping member is rotated away from the center of the film.

3. The process recited by claim 1 wherein each film gripping member is pivotally secured to an associated expansion member for ensuring that the pulling force exerted by the film gripping member is radial relative to the center of the film.

4. The process recited by claim 1 wherein the polymer film is a film of extruded PTFE.

5. The process recited by claim 4 wherein the extruded PTFE film initially includes a lubricant, and wherein the process includes the steps of folding the extruded film upon itself, rolling the folded PTFE film between a pair of rollers, and drying the lubricant from the rolled PTFE film before securing the film to the film gripping members.

6. The process recited by claim 4 including the step of heating the PTFE film to a temperature in the range of 200–300 degrees Centigrade before expanding the film.

7. The process recited by claim 4 including the step of locking the expanded film in its expanded dimensions, and heating the locked film at a temperature above 350 degrees Centigrade to sinter the PTFE film.

8. The process recited by claim 7 wherein said locking step includes the step of applying a clamping mechanism to opposing faces of the expanded film before releasing the expanded film from the film gripping members.

9. The process recited by claim 1 including the step of trimming the periphery of the film to correspond with the pattern of film gripping members before such film gripping members are expanded.

10. A process for uniformly expanding a polymer film in multiple directions, the polymer film having a center, the process comprising in combination the steps of:

a. securing the periphery of the film to a plurality of symmetrically-disposed film gripping members, each of said film gripping members being equidistant from the center of the film;

b. simultaneously rotating each of the plurality of film gripping members through an arc away from the center of the film to stretch and expand the film while maintaining said plurality of film gripping members equidistant from the center of the film, wherein the rate at which each film gripping member moves away from the center of the film continuously increases as each film gripping member is rotated away from the center of the film; and c. maintaining the pulling force exerted by each film gripping member radial relative to the center of the film thereby forming a uniformly expanded polymer film.

11. A process for uniformly expanding a polymer film in multiple directions, the polymer film having a center, the process comprising in combination the steps of:

a. extruding a polytetrafluoroethylene film, said extruded polytetrafluoroethylene film initially including a lubricant;

b. folding the extruded polyterafluoroethylene film upon itself, rolling the folded polytetrafluoroethylene film between rollers, and drying the lubricant from the rolled polytetrafluoroethylene film;

c. securing the periphery of the film to a plurality of symmetrically-disposed film gripping members, each of said film gripping members being equidistant from the center of the film;

d. simultaneously rotating each of the plurality of film gripping members through an arc away from the center of the film to stretch and expand the film while maintaining said plurality of film gripping members equidistant from the center of the film; and e. maintaining the pulling force exerted by each film gripping member radial relative to the center of the film thereby forming a uniformly expanded polymer film.

* * * * *